(12) United States Patent
Coon

(10) Patent No.: US 7,570,458 B1
(45) Date of Patent: Aug. 4, 2009

(54) DISK DRIVE SUSPENSION WITH REDUCED OFF-TRACK ERROR

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 602 days.

(21) Appl. No.: 11/123,446

(22) Filed: May 6, 2005

Related U.S. Application Data

(60) Provisional application No. 60/666,514, filed on Mar. 29, 2005.

(51) Int. Cl.
*G11B 5/48* (2006.01)
*G11B 21/16* (2006.01)

(52) U.S. Cl. .................. 360/244.5; 360/245.1

(58) Field of Classification Search .............. 360/265.9, 360/266, 244.5, 244.6, 244.7, 245.1
See application file for complete search history.

(56) References Cited

U.S. PATENT DOCUMENTS

| | | | |
|---|---|---|---|
| 5,012,367 A | * | 4/1991 | Toensing ................. 360/244.5 |
| 5,291,360 A | * | 3/1994 | Foote ....................... 360/244.5 |
| 6,061,205 A | | 5/2000 | Finegan |
| 6,063,508 A | | 5/2000 | Hanrahan et al. |
| 6,445,545 B1 | | 9/2002 | Guo et al. |
| 2004/0070882 A1 | * | 4/2004 | Wada et al. ............... 360/244.5 |
| 2005/0128645 A1 | | 6/2005 | Limmer et al. |
| 2005/0270698 A1 | | 12/2005 | Oh et al. |

* cited by examiner

*Primary Examiner*—Craig A Renner
(74) *Attorney, Agent, or Firm*—Intellectual Property Law Offices of Joel Voelzke, APC

(57) ABSTRACT

Apparatus for a disk drive having an actuator controlled suspension in operative association with a disk. The suspension mounting plane datum plane and suspension datum plane diverge at an acute angle. When the suspension is subjected to use conditions including seek operations and disk-induced turbulent wind flow conditions and induce sway forces and torsion forces that produce lateral off-track motions of the slider gap, the extension of the suspension datum plane substantially through the slider center of mass minimizes sway forces, and lateral off track motion of the slider gap is minimized. Error from torsion forces is minimized by having the dimple center of curvature coincide with a horizontal plane including the slider gap and having the dimple longitudinal axis extend through the slider center of mass, so that both sway and torsion force sources of track misregistration are addressed.

31 Claims, 4 Drawing Sheets

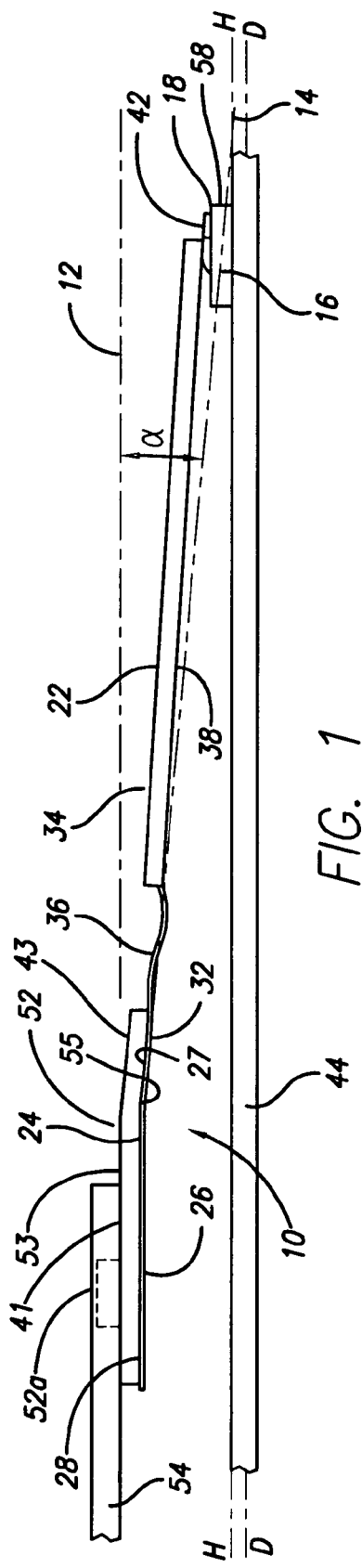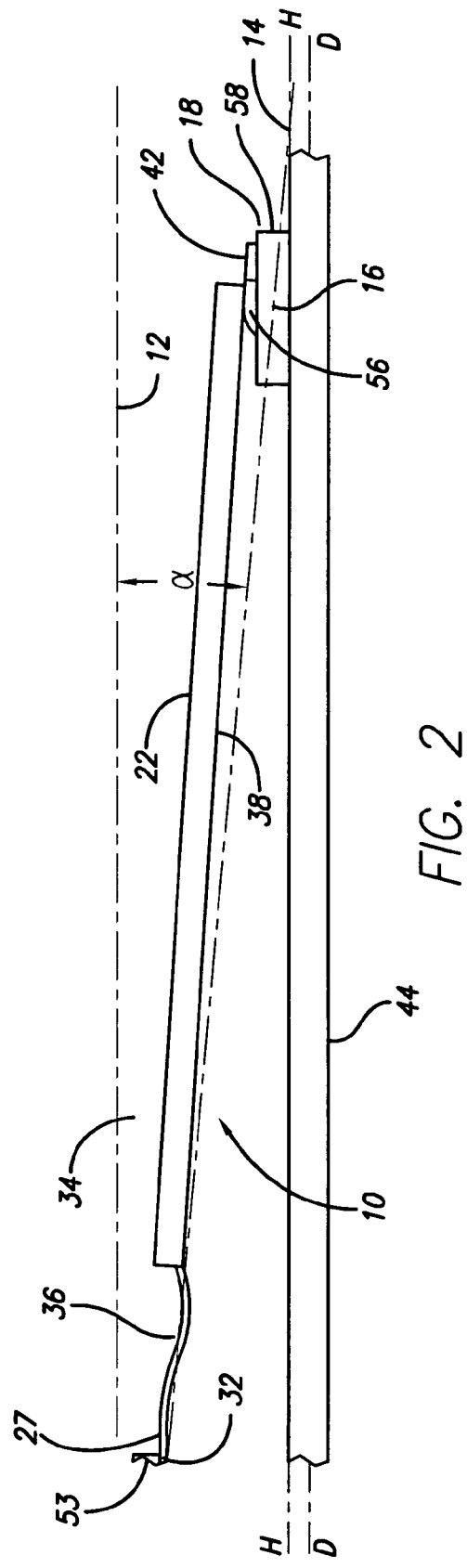

DISK DRIVE SUSPENSION WITH REDUCED OFF-TRACK ERROR

CROSS-REFERENCE TO RELATED APPLICATIONS

This application claims the benefit of U.S. Provisional Application Ser. No. 60/666,514, filed Mar. 29, 2005.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to improvements in the design and use of disk drive suspensions to reduce to near extinction disk drive off-track errors, e.g. track misregistration errors (TMR), that have proved irremediable by conventional disk drive design and manufacturing execution.

Off-track motion, generally, and TMR specifically, herein refer to unwanted variances in the position and attitude of the slider gap from that desired. A slider is an aerodynamic body that carries a magnetic head in operating proximity to a rotating disk A slider gap is the space between the pole pieces of the slider-carried magnetic head. As part of a magnetic head, a gap can produce or sense magnetic fields. For convenience, the ensuing invention description will generally refer to the slider gap (inclusive of the read gap and the write gap) as the write gap, unless otherwise indicated.

Insufficiently addressed sources of off-track motion include reaction effects from seek movements of the suspension, sway vibration forces, and torsional vibration forces. These three main sub-components of TMR, off-track motion, or out-of-phase motion more specifically include:

1. In seek mode, the slider gap oppositely reacts to a command, e.g. initially goes left when the actuator/suspension combination is commanded right;

2. Sway vibrations of the actuator-suspension result in off-track oscillations when the actuator/suspension combination is commanded to hold stationary over the track; and, 3. Torsional vibrations of the actuator/suspension result in further off-track oscillations when the actuator/suspension combination is commanded to hold stationary over the track.

In the invention, changes in the heretofore standard spaced-apart positional relationships of the suspension datum plane and the slider center of mass to one of coincidence in positional relationships reduces the lateral off-track motions of the slider write gap from sway forces encountered by the suspension. In one aspect, then, the invention changes the usual location of the suspension datum plane: extending outward in the plane of the conventional, single plane mounting plate, and thus spaced from the slider center of mass, to a suspension datum plane location determined by an angle made by a two plane mounting plate to bring the suspension datum plane to intersect with the slider center of mass. The former moment arm from the datum plane to the slider center of mass is reduced to zero length and sway forces are not multiplied as formerly. Center of mass of a slider herein refers to that locus where all the slider mass is apparently concentrated.

In another aspect of the invention, off-track motions of the slider gap from torsion forces encountered by the suspension are reduced by changing the usual spaced relationship of the dimple center of curvature and the slider gap horizontal plane to make them substantially coincident. Thus, the moment arm formerly existing by virtue of the spacing of the slider gap horizontal plane and the dimple center of curvature is also reduced to zero length and torsion forces are not multiplied as formerly.

Further, making the dimple longitudinal axis (an imaginary line about which the dimple extends, which line lies normal to the plane from which the dimple protrudes) substantially coincident with the vertical plane of the slider center of mass ameliorates slider gap reaction effect errors.

2. Description of the Related Art

Disk drives have within a close-fitting housing a motor and spindle, one or more disks on the spindle, one or more suspensions for each disk, each suspension comprising a load beam, actuators for shifting the suspensions over the disk(s), one or more read/write (RAN) heads and an aerodynamic carrier (typically being called a slider generally and in this description) carried by the suspension(s), and associated electronics, all assembled to pass a circular track of data repeatably under the R/W head so that data can be written to the disk and then accurately retrieved.

All the just mentioned components of a disk drive have design and manufacturing tolerance limitations and bring errors with them. Continual efforts on each component are being made to reduce the errors to as small a number and effect as possible.

SUMMARY OF THE INVENTION

It is an object of the present invention to provide an improved disk drive having fewer and less severe limitations and errors. It is a further object to provide a suspension and actuator combination for a disk drive suspension for such an improved disk drive. It is a further object to provide a novel arrangement of suspension components that minimizes errors. It is a particular object to achieve minimization of errors through a reduction in the force displacement of error-generating motions. It is another object to provide a disk drive suspension in which applied force from the actuator through the suspension to the slider and the slider center of mass are substantially coincident and not spaced to thus minimize torque applied to the slider. A still further object is to provide such a disk drive suspension in which the center of curvature of the dimple and the horizontal plane containing the slider gap are substantially coincident so as to minimize lateral gap displacement during suspension torsional vibration. An additional object is to provide disk drive suspension in which the off track lateral displacement motions, and therefore TMR errors due to torsional and sway vibrations, are reduced, thus minimizing drive performance degradations from seek and windage sources. A further object is to provide a mounting plate that has angled parts to direct the suspension beam portion along a suspension datum plane that diverges from the mounting datum plane, the base part being free of strain concentrating openings or holes, in contrast to U.S. Pat. No. 6,063,508, for example where the base part of the mounting plate is intentionally apertured to enable part distortion for gram adjustment at the mounting plate. This practice, however, makes the mounting plate less rigid, an undesirable result since mounting plate rigidity is essential for optimum suspension resonance, shock and uniformity of performance (reduced sigma). The availability of better techniques for making gram adjustments, such as laser heating of the hinge region, makes the '508 patent approach unnecessary as well as undesirable.

An object of the invention is to provide a suspension in which the mounting plate is prebent to an angle determined by the design, so that the suspension datum plane passes through the slider center of mass as the suspension is designed, with a single angle across all replications of the suspension. Bending the mounting plate to an individuated if not different angle for each replication, as for gram adjustment, as in the '508 patent, is not a part of the invention.

A further object of the invention is to provide an apparatus and a method of operating a disk drive having an actuator controlled suspension in operative association with a disk and in which the suspension has a suspension datum plane and supports in gimballing relation a slider having a center of mass and a gap under use conditions including seek operations and/or disk-induced turbulent wind flow conditions that induce sway and/or torsion forces that produce lateral off-track motions of the slider gap, and maintaining the suspension datum plane substantially through the slider center of mass during such use conditions, whereby said sway forces are applied through said slider center of mass in lateral off track motion of said slider gap minimizing relation, and torsion forces are also minimized by having the dimple center of curvature lie substantially in the horizontal plane of the slider center of mass while the dimple longitudinal axis lies substantially coincident with vertical plane of the slider center of mass.

It is a further object to improve both conventional, single stage actuated suspensions, and dual stage actuated and microactuated suspensions with the invention disk drive suspension configuration described.

Suspension design improvement in the past has included efforts to increase the suspension resonant peak frequencies and reduce resonant peak amplitudes for greater performance of the disk drive, to compensate for off-track errors and limit the observed effects of off-track errors. The present invention takes the tack of minimizing off-track motions rather than to tolerate these errors in the assembly and attempt to compensate for them by such expedients as the use of notch filters in the servo circuitry to reduce the effect of resonant modes even further over selected frequency bands.

Presently conventional suspensions most commonly have the dimple on the load beam concave upwards in contact with a flat flexure, or the dimple on the flexure in contact with a flat load beam contact surface, or a ring gimbal on top of the slider. The ring gimbal configuration generally lacks a dimple, an exception being the IBM 3350 series. To get the best performance from a suspension the vibration resonance modes are a primary consideration in design and manufacturing. Commonly, as part of the suspension manufacturing process the hinge or spring section of the suspension is formed in such a way that the first torsion frequency and amplitude are optimized (maximized and minimized respectively.) The second torsion and sway resonance modes are controlled mostly by the design of the suspension geometry. These efforts are somewhat effective in reducing TMR (i.e. the off track error), but sufficient TMR remains to be problematic and, in fact, to be one of the main impediments to achieving suspension placement accuracy that will enable use in disk drives of disks with the highest possible areal density (data capacity per unit area).

In accordance with the invention, sources of suspension vibrations at other than resonant frequencies (referred to as non-resonant frequency vibrations herein) are attacked and minimized or eliminated rather than to further dwell on the much treated phenomenon of vibration of the suspension at resonant frequencies. These non-resonant frequency vibrations, while smaller, and in some cases considered merely noise, are becoming more prominent as the major vibration problems are progressively solved. In fact, their elimination is key to use of maximum areal density disks.

Thus, after the peak resonant responses are reduced to their minimums there is still a component of TMR or off-track motion left unaddressed. This stubbornly remnant component of off-track motion can be characterized as an out-of-phase movement of the slider gap with respect to the actuator, involving, as listed above, slider gap reaction to seek commands, and sway and torsional vibrations in response to hold-stationary commands that produce off-track oscillations U.S. Pat. No. 6,445,545 to Guo et al addresses torsion vibration but not in a dimple-containing design. Guo et al use a ring gimbal (dimple-less) attached to the lower surface of the slider (opposite to the top surface generally used). This design approach has a serious drawback: It is difficult to apply a suitably high vertical load while simultaneously achieving sufficiently low roll and pitch stiffness without contacting the disk with the flexure. This drawback prevents the Guo et al design from being capable of establishing the pitch and roll axes in the most desirable locations. Also, the pitch and roll axes will change with load on a dimple-less design, making the axes a function of applied vertical loading, with the optimum axes locations achievable only for the case with the highest applied loads. Further, Guo et al in this patent do not address the problems of seek reaction or sway vibration errors.

The foregoing objects are realized according to the invention in a disk drive suspension having angularly divergent mounting datum and suspension datum planes and extending the suspension datum plane substantially through the slider center of mass particularly for minimization of sway force effects. In addition, to minimize torsion force effects, the dimple center of curvature is coplanar with the slider write gap horizontal plane, and the dimple longitudinal axis is coincident with the vertical plane including the slider center of mass.

Accordingly, the invention includes the method of operating a disk drive having an actuator controlled suspension in operative association with a disk, the suspension having a suspension datum plane and supporting in gimballing relation a slider having a center of mass and a write gap, the method including subjecting the suspension to use conditions including seek operations and/or disk-induced turbulent wind flow conditions inducing sway forces that produce lateral off-track motions of the slider write gap, and maintaining the suspension datum plane substantially through the slider center of mass during the use conditions, whereby the sway forces are applied through the slider center of mass in lateral off track motion of the slider gap minimizing relation.

In this and like embodiments, typically, the method includes mounting the suspension to an actuator by a mounting plate that extends in a mounting datum plane and that defines the suspension datum plane in angled relation to the mounting datum plane, whereby the suspension datum plane extends substantially through the slider center of mass, the slider write gap extends in a horizontal plane, and including also gimballing the slider on a dimple having a center of curvature substantially coincident with the slider gap horizontal plane in torsion force minimizing relation, the suspension comprises a base, a hinge and a beam, and including also disposing the suspension hinge and beam beyond the suspension datum plane while maintaining the slider center of mass substantially within the suspension datum plane, mounting the suspension to an actuator by a mounting plate extending in a mounting datum plane that does not include the slider center of mass, the suspension base having a surface that defines the suspension datum plane angled from the mounting datum plane to extend the suspension datum plane substantially through the slider center of mass, and, the slider gap extends in a horizontal plane, and including also gimballing the slider on a dimple having a center of curvature substantially coincident with the slider gap horizontal plane to minimize torsion forces acting on the suspension.

In a further embodiment, the invention provides a method of operating a disk drive having an actuator controlled suspension in operative association with a disk, the suspension having a suspension datum plane and supporting in gimballing relation a slider having a center of mass and a write gap, the method including subjecting the suspension to use conditions including seek operations and/or disk-induced turbulent wind flow conditions inducing sway forces that produce lateral off-track motions of the slider gap, and maintaining the suspension datum plane through the slider center of mass during the use conditions, whereby the sway forces are applied through the slider center of mass in lateral off track motion of the slider gap minimizing relation.

In this and like embodiments, the method also includes mounting the suspension by a mounting plate defining a mounting datum plane and a suspension datum plane angled from the mounting datum plane, and extending the suspension datum plane substantially through the slider center of mass, the slider gap extends in a horizontal plane, and including also gimballing the slider on a dimple having a center of curvature coincident with the slider gap horizontal plane in torsion force on the suspension minimizing relation, the suspension comprises a base within the suspension datum plane, and a hinge and a beam, and including also disposing said hinge and beam between the mounting datum plane and the suspension datum plane, mounting the suspension by a mounting plate extending in a mounting datum plane that does not include the slider center of mass, the mounting plate having a surface that defines the suspension datum plane in angled relation to the mounting datum plane, and extending the suspension datum plane substantially through the slider center of mass, and having the slider write gap extend in a horizontal plane, and including also gimballing the slider on a dimple having a center of curvature coincident with the slider gap horizontal plane to minimize torsion forces acting on the suspension.

In a further embodiment, the invention provides a method of operating a disk drive having an actuator controlled suspension in operative association with a disk, the suspension having a suspension datum plane and supporting on a dimple in gimballing relation a slider having a center of mass and a write gap extending in a horizontal plane, the dimple having a center of curvature, the method including subjecting the suspension to use conditions including seek operations and/or disk-induced turbulent wind flow conditions inducing torsion forces tending to rotate the suspension about its longitudinal axis, and maintaining the dimple center of curvature substantially coincident with the slider gap horizontal plane in torsion forces minimizing relation.

In this and like embodiments, typically, there is also included subjecting the suspension to use conditions including seek operations and/or disk-induced turbulent wind flow conditions inducing sway forces that produce lateral off-track motions of the slider gap, and extending the suspension datum plane substantially through the slider center of mass during the use conditions, whereby the sway forces are applied through the slider center of mass in lateral off track motion of the slider gap minimizing relation, mounting the suspension by a mounting plate extending in a mounting datum plane that does not include the slider center of mass, the mounting plate having a surface that defines a suspension datum plane angled from the mounting datum plane, and extending the suspension datum plane substantially through the slider center of mass, extending the slider write gap in a horizontal plane, and including also gimballing the slider on a dimple having a center of curvature substantially coincident with the slider gap horizontal plane, having the suspension comprise a base, a hinge and a beam, and including also disposing the suspension hinge and beam beyond the suspension datum plane, and maintaining the slider center of mass substantially within the suspension datum plane, subjecting the suspension to use conditions including seek operations and/or disk-induced turbulent wind flow conditions inducing sway forces that produce lateral off-track motions of the slider gap, and extending the suspension datum plane through the slider center of mass during the use conditions, whereby the sway forces are applied through the slider center of mass in lateral off track motion of the slider gap-minimizing relation, mounting the suspension by a mounting plate extending in a mounting datum plane that does not include the slider center of mass, the mounting plate having a surface that defines a suspension datum plane angled from the mounting datum plane, and extending the suspension datum plane substantially through the slider center of mass, and extending the slider gap in a horizontal plane, and including also gimballing the slider on a dimple having a center of curvature coincident with the slider gap horizontal plane.

In a further embodiment of the invention, there is provided a method of operating a disk drive having an actuator controlled suspension in operative association with a disk, the suspension having a suspension datum plane and supporting on a dimple in gimballing relation a slider having a center of mass and a write gap extending in a horizontal plane, the dimple having a center of curvature, the method including subjecting the suspension to use conditions including seek operations and/or disk-induced turbulent wind flow conditions inducing torsion forces tending to rotate the suspension about its longitudinal axis, and maintaining the dimple center of curvature coincident with the slider gap horizontal plane in torsion forces-minimizing relation.

In a still further embodiment, there is provided a method of operating a disk drive having an actuator controlled suspension in operative association with a disk, the suspension having a suspension datum plane and comprising a beam, a flexure, a dimple, and a slider having a center of mass and a write gap and in gimballing relation with the beam across the dimple, the method including subjecting the suspension to use conditions including seek operations and/or disk-induced turbulent wind flow conditions inducing sway forces that produce lateral off-track motions of the slider gap and/or wind-flow induced torsion forces tending to rotate the suspension about its longitudinal axis and rotate the slider gap about the dimple, maintaining the suspension datum plane substantially through the slider center of mass during the use conditions; the slider gap extending in a horizontal plane, the dimple having a longitudinal axis and a center of curvature, maintaining the dimple center of curvature substantially coincident with the slider gap horizontal plane, and maintaining the dimple longitudinal axis substantially coincident with the slider center of mass, whereby the sway forces are applied through the slider center of mass in lateral off track motion of the slider gap-minimizing relation and/or the torsion forces are applied through the slider gap and torsional off track motions of the slider gap are minimized.

In this and like embodiments, there is also included, typically, mounting the suspension to an actuator by a mounting plate extending in a mounting datum plane and defining the suspension datum plane in angled relation to the mounting plate datum plane such that the suspension datum plane extends substantially through the slider center of mass, maintaining the suspension datum plane at the slider closer to the slider center of mass than to the mounting datum plane, having the suspension comprise a base, a hinge and a beam, and including also disposing the base and slider center of mass within the suspension datum plane, and disposing the suspension hinge and beam beyond the suspension datum plane, and disposing the suspension hinge and beam beyond the suspension datum while maintaining the slider center of mass substantially within the suspension datum plane.

In a further embodiment, the invention provides a method of manufacturing a disk drive suspension comprising a beam extending in a suspension datum plane and a slider having a center of mass and a slider write gap, including supporting the slider in gimballing relation with the beam, and maintaining the suspension datum plane substantially through the slider center of mass.

In this and like embodiments, typically, the invention method further includes attaching the suspension to a mounting plate defining a mounting datum plane in angled relation to the suspension datum plane such that the suspension datum plane extends substantially through the slider center of mass, extending the slider write gap in a horizontal plane, gimbal engaging the slider on a dimple having a center of curvature, and maintaining the dimple center of curvature substantially coincident with the slider gap horizontal plane, providing the suspension with a base and a hinge to support the beam, and disposing the suspension hinge and beam beyond the suspension datum plane and arranged to maintain the slider center of mass substantially within the suspension datum plane, mounting the suspension to an actuator by a mounting plate having a surface defining a mounting datum plane that does not include the slider center of mass, the suspension base having a surface angled from the mounting plate surface, defining the suspension datum plane by the suspension base surface, and maintaining the suspension datum plane extending substantially through the slider center of mass, having the slider center of mass lie in a vertical plane and the dimple have a longitudinal axis, and maintaining the dimple longitudinal axis substantially coincident with the slider center of mass vertical plane, extending the slider gap in a horizontal plane, gimbal engaging the slider on a dimple having a center of curvature, and maintaining the dimple center of curvature coincident with the slider gap horizontal plane, providing the suspension with a base and a hinge to support the beam, and disposing the suspension hinge and beam beyond the suspension datum plane while maintaining the slider gap substantially within the suspension datum plan, mounting the suspension base to an actuator by a mounting plate defining a mounting datum plane, the suspension base defining the suspension datum plane angled relative to the mounting datum plane, and extending the suspension datum plane substantially through the slider center of mass.

In a further embodiment, the invention provides a method of manufacturing a disk drive suspension comprising a base portion, a hinge portion and a beam portion supporting a slider having a center of mass, and a mounting plate for attaching the base portion to an actuator and for directing the beam portion, including extending a first part of the mounting plate in a mounting datum plane, extending a second part of the mounting plate in a suspension datum plane, and maintaining the mounting plate first and second parts in angled relation, whereby the suspension datum plane intersects with the slider center of mass.

In a further embodiment, the invention provides a method of operating a disk drive having an actuator controlled suspension in operative association with a disk, the suspension comprising a base portion, a hinge portion and a beam portion supporting a slider having a center of mass, and a mounting plate having a first part and a second part in angled relation, including mounting the suspension on the actuator with the mounting plate, and maintaining the base portion in the angled relation of the mounting plate first and second parts, whereby the suspension datum plane intersects with the slider center of mass.

In its apparatus aspects, the invention provides a mounting plate for a disk drive suspension comprising a base portion, a hinge portion and a beam portion, the mounting plate having a first part for attaching to an actuator, and a second part at an angle thereto for carrying the suspension beam portion at that angle, the mounting plate being free of aperturing providing a strain concentration.

A further invention apparatus includes for mounting a disk drive suspension having a base portion, a hinge portion and a beam portion carrying a slider, a mounting plate having a first part for attaching to an actuator, and a second part at an angle of about 0.5 degree to about 5 degrees to the first part for supporting said suspension at said angle, said mounting plate being free of aperturing providing a strain concentration.

The invention further provides a disk drive suspension in which the mounting datum plane and the suspension datum plane diverge so that the suspension datum plane extends through the center of mass of the slider. More particularly, the invention suspension comprises a load beam having a proximate region comprising a base portion extending in a mounting datum plane and also extending in a suspension datum plane at an angle to the mounting datum plane, and a distal region comprising a hinge portion and a beam portion, a flexure carried by the suspension distal region and supporting a slider in gimballing relation with the beam portion for operative association of the slider with a disk, with the suspension datum plane extending substantially through the slider center of mass.

Additionally, the suspension typically has a mounting plate for attaching the suspension to an actuator, a dimple for gimballing the slider relative to the beam portion, and a slider write gap extending in a horizontal plane. The dimple has a center of curvature that is substantially coincident with the slider gap horizontal plane. Further, typically, the slider has a center of mass that lies in a vertical plane, and the dimple has a longitudinal axis that is substantially coincident with the slider center of mass vertical plane.

In a further embodiment, the invention provides a disk drive suspension comprising a load beam having a proximate region comprising a base portion extending in a mounting datum plane and defining a suspension datum plane, and a distal region comprising a hinge portion and a beam portion, a flexure carried by the suspension distal region and supporting a slider in gimballing relation with the beam portion for operative association of the slider with a disk, and a mounting plate for attaching the load beam base portion to an actuator, the mounting plate defining the mounting datum plane, the suspension datum plane extending in angled relation to the mounting datum plane.

In this and like embodiments, typically, the slider has a center of mass and the suspension datum plane extends through the slider center of mass, there is also included a dimple for gimballing the slider relative to the beam portion, the suspension datum plane extending substantially through the slider center of mass, the slider has a write gap extending in a horizontal plane, the dimple has a center of curvature, the dimple center of curvature being substantially coincident with the slider gap plane, the slider center of mass lies in a vertical plane, the dimple having a longitudinal axis, the dimple longitudinal axis being substantially coincident with the slider center of mass vertical plane.

In a still further embodiment, the invention provides a disk drive suspension comprising a load beam having a proximate region comprising a base portion defining a suspension datum plane, and a distal region comprising a hinge portion and a beam portion, a flexure carried by the suspension distal region and supporting a slider having a center of mass, a dimple providing gimballing contact of the slider with the beam portion for operative association of the slider with a disk extending in a disk plane, and a mounting plate for attaching the load beam base portion to an actuator, the mounting plate defining the mounting datum plane, the suspension datum plane extending in angled relation to the mounting datum plane.

In this and like embodiments, typically, the suspension datum plane extends through the slider center of mass, the dimple has a center of curvature and a longitudinal axis, the slider write gap extends in a first plane substantially parallel with the plane of the disk and lies in a second plane normal to the first plane, the first plane substantially including the dimple center of curvature and the second plane being substantially parallel with the dimple longitudinal axis.

In a further embodiment, the invention provides a disk drive suspension having minimized off-track error from sway forces, the suspension comprising a load beam having a proximate region comprising a base portion extending in a suspension datum plane, and a distal region comprising a hinge portion and a beam portion, a flexure carried by the suspension distal region and supporting a slider having a center of mass in gimballing relation with the beam portion for operative association of the slider with a disk, and a mounting plate for attaching the load beam base portion to an actuator, the mounting plate defining a mounting datum plane, the suspension datum plane extending in angled relation to the mounting datum plane and through the slider center of mass in sway force induced off-track error minimizing relation.

In this and like embodiments, typically, there is also included a dimple for the gimballing of the slider, the dimple having a center of curvature and a longitudinal axis, the slider having a write gap extending in a plane substantially parallel with the disk plane, the slider write gap plane including the dimple center of curvature, and the dimple longitudinal axis extending through the slider center of mass.

In yet another embodiment, the invention provides a disk drive suspension having minimized off-track error from torsion forces, the suspension comprising a load beam having a proximate region comprising a base portion extending in a suspension datum plane, and a distal region comprising a hinge portion and a beam portion extending outside of the suspension datum plane, a flexure carried by the suspension distal region and supporting a slider having a center of mass in gimballing relation with the beam portion for operative association of the slider with a disk, a mounting plate for attaching the load beam base portion to an actuator, the mounting plate defining a mounting datum plane, the suspension datum plane extending in angled relation to the mounting datum plane, the slider defining a write gap extending in a horizontal plane substantially parallel to the disk, and a dimple between the flexure and the beam portion in slider gimballing relation, the dimple having a center of curvature substantially within the slider gap horizontal plane to apply torsion forces through the slider gap in off track error from torsion forces-minimizing relation, and the suspension datum plane extends through the slider center of mass.

In a further embodiment, the invention provides a disk drive suspension having minimal lateral response to sway forces from seek operations and/or disk induced turbulent air flow over the suspension, the suspension being adapted for mounting by a mounting plate defining a mounting datum plane, the suspension comprising a load beam supportable by the mounting plate and defining along its longitudinal axis a suspension datum plane disposed at an acute angle to the mounting datum plane, a flexure supported by the load beam, and a flexure-mounted slider in gimballing association with the load beam, the slider having a write gap and a center of mass, the suspension datum plane extending substantially through the slider center of mass.

In a further embodiment, the invention provides a suspension for a disk drive comprising a slider having a write gap extending in a horizontal plane and a center of mass, a load beam for supporting the slider, the load beam having a base portion, a hinge portion and a beam portion carrying a flexure mounting the slider, a dimple in engagement with the flexure for slider gimballing, a mounting plate mounting the load beam base portion at a surface defining a mounting datum plane, the dimple having a center of curvature substantially in the horizontal plane of the slider gap and a longitudinal axis substantially in the vertical plane of the center of mass, a suspension datum plane including a part of the base portion and extending substantially through the slider center of mass, the suspension datum plane being angled relative to the mounting plane datum plane.

In a still further embodiment, the invention provides a suspension for a disk drive comprising
- a mounting plate comprising a mounting surface defining a mounting datum plane,
- a load beam adapted to be mounted to an actuator by the mounting plate and comprising
  - a base portion defining a suspension datum plane,
  - a hinge portion and
  - a rigid portion,
- a dimple having a center of curvature and a longitudinal axis,
- a slider having a write gap and a center of mass, and
- a flexure comprising
  - a slider support engaging the slider with the dimple,
    - said slider write gap extending in a horizontal plane,
      the slider center of mass lying in a vertical plane,
    - said slider comprising a first surface facing the dimple, and
    - a second surface facing away from the dimple,
      said second surface defining the slider horizontal plane and including the write gap,
    - said dimple center of curvature lying substantially in the horizontal plane,
    - said dimple longitudinal axis lying in the slider center of mass vertical plane, and
- said suspension datum plane extending substantially through the slider center of mass.

BRIEF DESCRIPTION OF THE SEVERAL VIEWS OF THE DRAWINGS

The invention will be further described in conjunction with the attached drawings in which:

FIG. 1 is a side elevation view of the invention suspension;

FIG. 2 is a fragmentary view side elevation view of the suspension, enlarged;

DETAILED DESCRIPTION OF THE INVENTION

Figure 4:
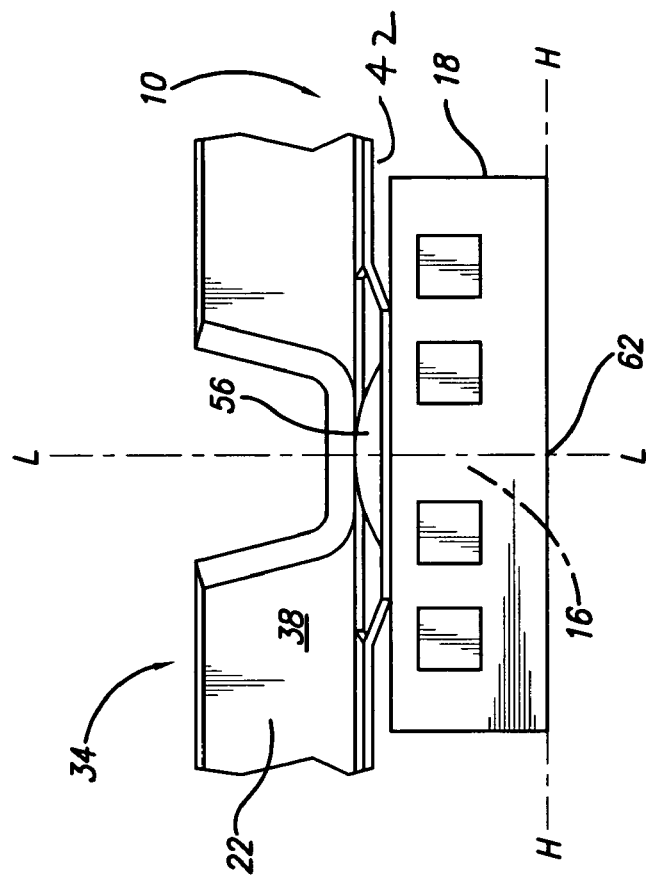
FIG. 4 is a front view of the suspension.
Figure 3:
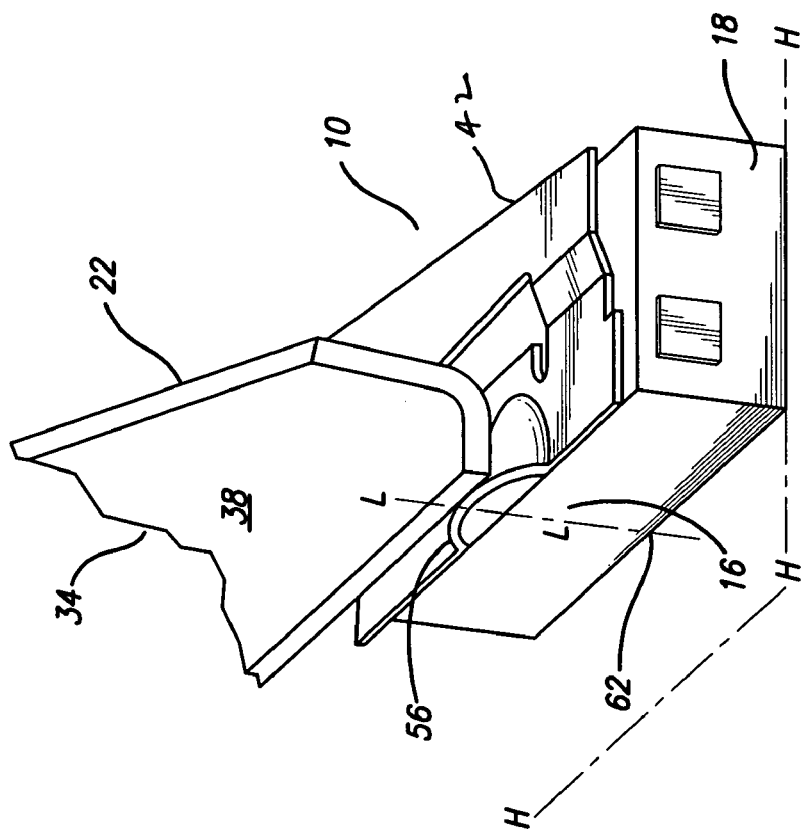
FIG. 3 is an orthogonal view of a longitudinal section of the suspension.
Figure 5A:
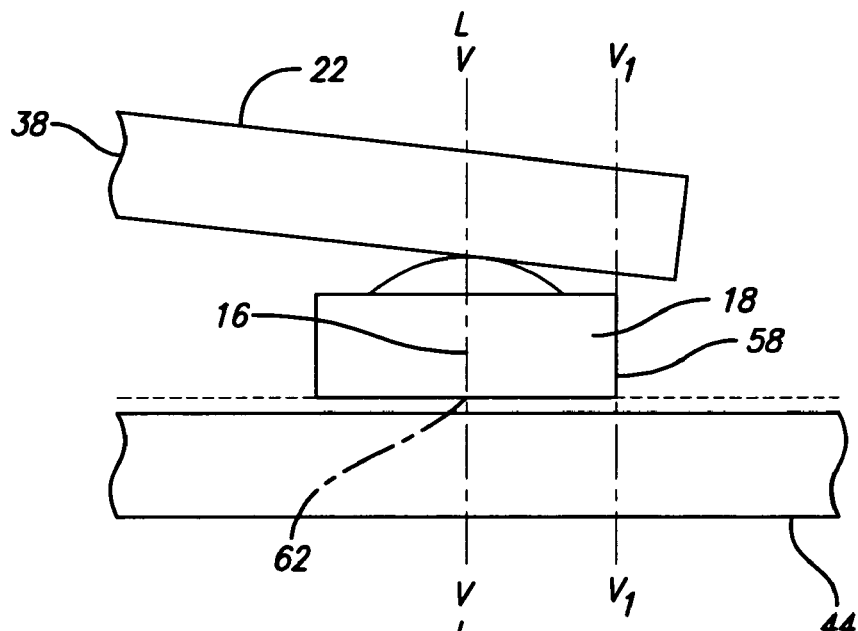
FIG. 5A is a partly schematic, fragmentary side elevation view of the suspension.
Figure 5B:
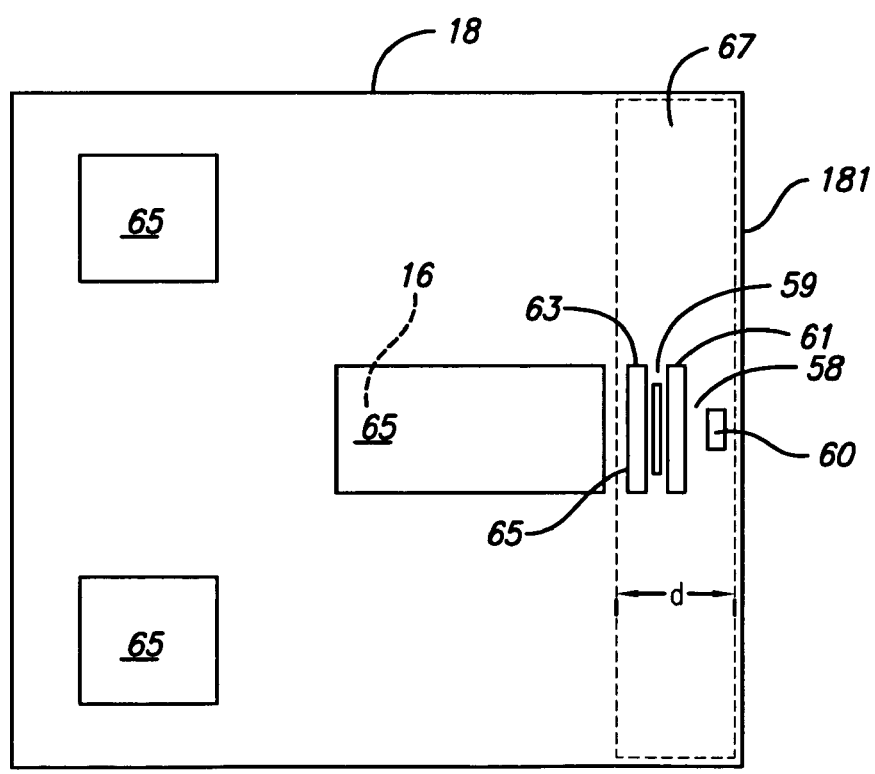
FIG. 5B is a bottom plan view of the slider of FIG. 5A.
Figure 6:
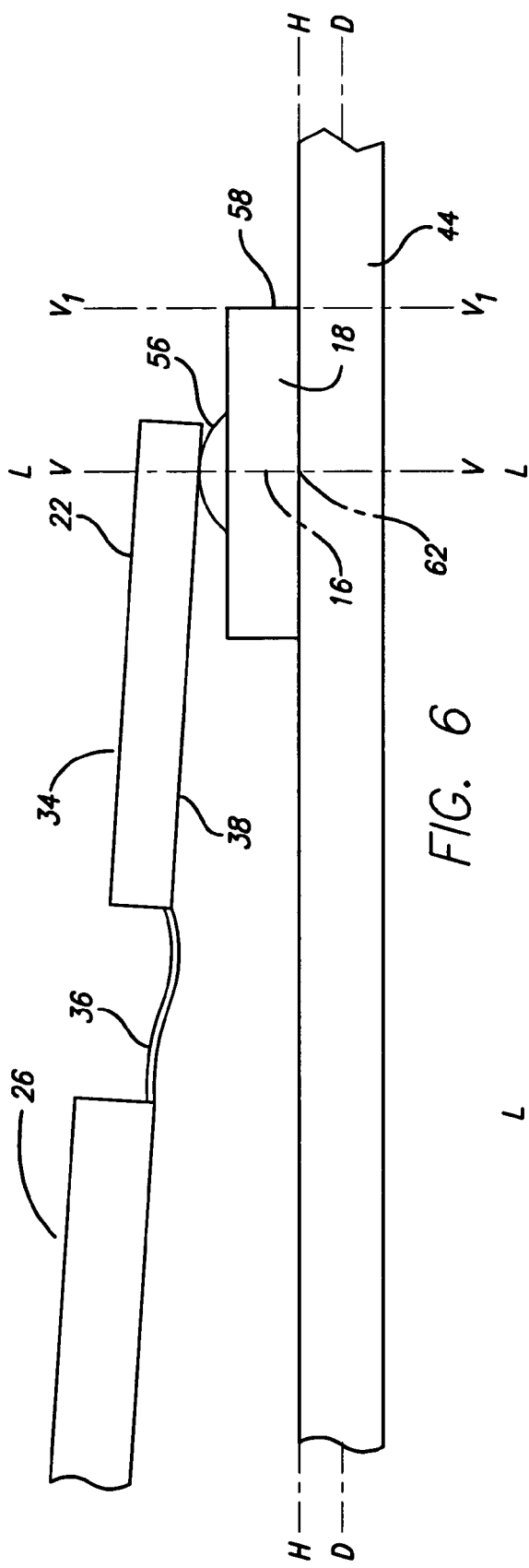
FIG. 6 is a fragmentary side elevation view of the suspension illustrating optimum sway mode condition.
Figure 7B:
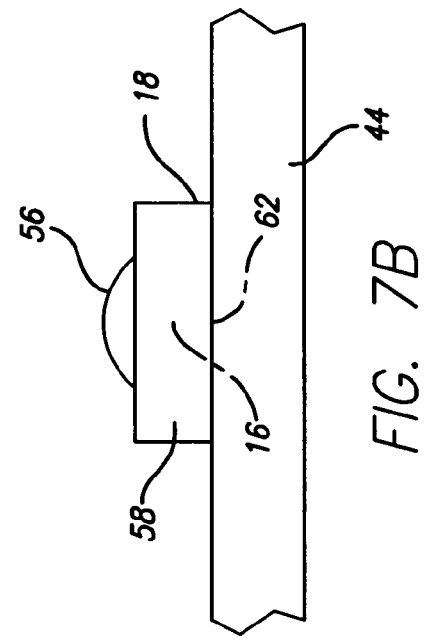
FIG. 7A is a fragmentary side elevation view of the suspension illustrating optimum torsion mode condition; and, FIG. 7B is a front elevation view of the suspension of FIG. 7A.
Figure 7A:
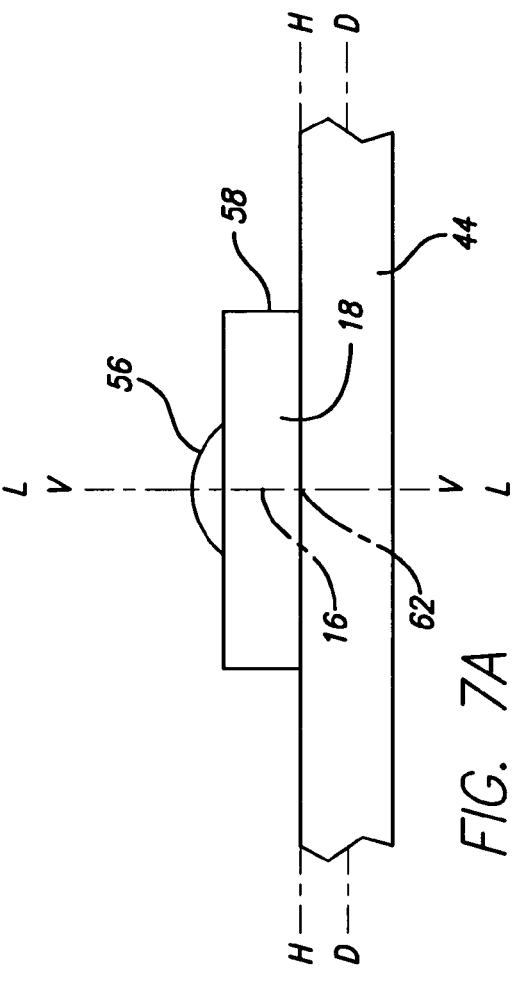

With reference now to the drawings in detail, in FIGS. 1-7B, disk drive suspension 10 has its mounting datum plane 12 and its suspension datum plane 14 diverge so that the suspension datum plane extends through the center of mass 16 of the slider 18. Suspension 10 comprises a load beam 22 having a proximate region 24 comprising a base portion 26 typically having a first part 28 extending in or parallel with the mounting datum plane 12 and a second part 32 extending in the suspension datum plane 14 at an angle α to the mounting datum plane. Base portion 26 is shown attached to the lower surface 55 of mounting plate 52, but can alternatively be attached to the top surface 53 thereof. Suspension 10 has a distal region 34 comprising a hinge portion 36 and a beam portion 38, a flexure 42 carried by the suspension distal region and supporting slider 18 in gimballing relation with the beam portion for operative association of the slider with a disk 44. Suspension datum plane 14 extends substantially through the slider center of mass, (e.g. exactly through or sufficiently close that the benefits of the invention are realized as described herein, or typically at least within about 0.001 inch of the slider center of mass 16).

Suspension mounting plate 52 has a first part 41 defining and within the mounting datum plane, and a second, angled part 43, defining and within the suspension datum plane to have the angled configuration shown. Mounting plate 52 is swaged to actuator 54 to attach the suspension 10 to the actuator. Dimple 56 is provided for gimballing the slider 18 relative to the beam portion 38. Slider 18 has a write gap 58 extending in a horizontal plane H-H (horizontal and vertical herein are used to describe the conventional disposition of the suspension 10, with the disk being read and written to being horizontal). The dimple 56 has a center of curvature 62 (the point from which the radius of the dimple extends to define the dimple curvature). In the invention, the center of dimple curvature 62 preferably is arranged to be substantially coincident with the slider horizontal plane H-H (that is exactly coincident or sufficiently close that the benefits of the invention are realized as described herein, or typically at least within about 0.001 inch of the plane H-H).

In addition, slider center of mass 16 lies in a vertical plane V-V, and the dimple 56 is arranged such that its longitudinal axis L-L is substantially coincident with the slider center of mass vertical plane V-V, (that is exactly coincident or sufficiently close that the benefits of the invention are realized as described herein, or typically at least within about 0.001 inch of the vertical plane V-V).

Thus in one embodiment, suspension 10 comprises load beam 22 having proximate region 24 comprising base portion 26 extending partially in mounting datum plane 12 and also defining suspension datum plane 14. Suspension distal region 34 comprises hinge portion 36 and beam portion 38, flexure 42 carried by the suspension distal region and supporting slider 18 in gimballing relation with the beam portion for operative association of the slider with disk 44. The suspension 10 further comprises mounting plate 52 for attaching the load beam base portion to actuator 54 via boss 52a, the mounting plate defining the mounting datum plane 12, and the suspension datum plane 14 extending in angled relation to the mounting datum plane.

Typically, the hinge and beam portions 36, 38 are arranged such that the slider 18 is carried by flexure 42 within the suspension datum plane 14. Further, typically, the suspension datum plane 14 extends through the slider center of mass 16 and the hinge and beam portions 36, 38 lie outside the suspension datum plane, as shown. Dimple 56 has a center of curvature 62 and a longitudinal axis L-L. The slider write gap 58 extends in a first, horizontal plane H-H substantially parallel with the plane D-D of the disk and lies as well in a vertical plane VI-VI parallel to plane V-V. First plane H-H substantially includes the dimple center of curvature 62 and the plane V-V is substantially coincident with the dimple longitudinal axis L-L. Slider write gap 58 is shown schematically in FIG. 5B. In practice, the write gap 58 (and the read gap 59 which is subsumed in the term gap or write gap herein unless otherwise indicated) are defined by spaced poles 60, 61 and 63 which extend into the page, and are but microscopic layers of various materials adhered to each other on the side 181 of the body of slider 18. For convenience of illustration, the poles 60, 61 and 63 and their gaps 58, 59 are shown as being within a facial region 67 on the slider side 181, but it should be recognized that the facial region has only an imperceptible horizontal extent d relative to slider 18 and its bearing surfaces 65.

For minimized off-track error from sway forces, particularly, the suspension 10 load beam 22 has a proximate region 24 comprising base portion second part 32 extending in a suspension datum plane 14, and a distal region 34 comprising hinge portion 36 and beam portion 38, a flexure 42 carried by the suspension distal region and supporting slider 18 having a center of mass 16 in gimballing relation with the beam portion for operative association of the slider with a disk, and a mounting plate 52 for attaching the load beam base portion to an actuator 54, the mounting plate defining a mounting datum plane 12, with the suspension datum plane 14 extending in angled relation a to the mounting datum plane and through the slider center of mass 16 in sway force induced off-track error minimizing relation.

For minimized off track error from torsion forces, particularly, the invention provides disk drive suspension 10 comprising load beam 22 having a proximate region 24 comprising base portion 26 extending in a suspension datum plane 14, and a distal region 34 comprising hinge and beam portions 36, 38 extending outside of the suspension datum plane, a flexure 42 carried by the suspension distal region and supporting a slider 18 having a center of mass 16 in gimballing relation with the beam portion for operative association of the slider with a disk, a mounting plate 52 for attaching the load beam base portion to an actuator 54, the mounting plate defining a mounting datum plane 12, the suspension datum plane extending in angled relation to the mounting datum plane, the slider defining a write gap 58 extending in a horizontal plane substantially parallel to the disk, and a dimple 56 between the flexure and the beam portion in slider gimballing relation, the dimple having a center of curvature 62 substantially within the slider gap 58 horizontal plane H-H to apply torsion forces through the slider gap in off track error from torsion forces-minimizing relation, the suspension datum plane 12 also extending through the slider center of mass 16 for sway force minimization.

Other embodiments include a suspension 10 for a disk drive comprising a slider 18 having a write gap 58 extending in a horizontal plane H-H and a center of mass 16, a load beam 22 for supporting the slider, the load beam having a base portion 26, a hinge portion 36 and a beam portion 38 carrying a flexure 42 mounting the slider, a dimple 56 in engagement with the flexure for slider gimballing, a mounting plate 52 having a surface 53 defining the mounting datum plane 12 and a surface 55 mounting the load beam base portion in the suspension datum plane, the dimple having a center of curvature 62 substantially in the horizontal plane H-H of the slider gap and a longitudinal axis L-L substantially in the vertical plane V-V of the center of mass, the suspension datum plane including a part of the base portion and extending substantially through the slider center of mass, the suspension datum plane 14 being angled at acute angle α relative to the mounting plane datum plane 12.

The invention methods include the method of operating a disk drive having in operative association with a disk 44 an actuator 54 controlled suspension 10 having a suspension datum plane 14 and supporting in gimballing relation on a dimple 56 a slider 18 having a center of mass 16 and a write gap 58, the method including subjecting the suspension 10 to use conditions including seek operations and/or disk-induced turbulent wind flow conditions that typically obtain in a close-fitting disk drive housing (not shown) inducing sway forces that produce lateral off-track motions of the slider write gap, and maintaining the suspension datum plane substantially through the slider center of mass during the use conditions, whereby the sway forces are applied through the slider center of mass in lateral off track motion of the slider gap minimizing relation.

Typically, this method also includes mounting the suspension 10 to an actuator 54 by a mounting plate 52 that extends in a mounting datum plane 12 and that defines the suspension datum plane 14 in angled relation to the mounting datum plane, whereby the suspension datum plane extends substantially through the slider center of mass 16, the slider write gap 58 extends in a horizontal plane H-H, and including also gimballing the slider 18 on dimple 56 having a center of curvature 62 substantially coincident with the slider gap horizontal plane in torsion force-minimizing relation, and where the suspension comprises a base 26, a hinge 36 and a beam 38, disposing the suspension hinge and beam beyond the suspension datum plane 14 while maintaining the slider center of mass 16 substantially within the suspension datum plane, mounting the suspension to an actuator by a mounting plate extending in a mounting datum plane that does not include the slider center of mass, the suspension base having a surface 27 that defines the suspension datum plane angled from the mounting datum plane 12 defined by surface 53 of the mounting plate to extend the suspension datum plane substantially through the slider center of mass, and, the slider gimballing on a dimple that has a center of curvature substantially coincident with the slider gap horizontal plane H-H to minimize torsion forces.

In a further embodiment, the invention provides a method of manufacturing a disk drive suspension 10 comprising a load beam 22 having part 32 extending in a suspension datum plane 14 and a slider 18 having a center of mass 16 and a slider write gap 58, including supporting the slider in gimballing relation with the beam, and maintaining the suspension datum plane 12 substantially through the slider center of mass. This method typically further includes attaching the suspension 10 to a mounting plate 52 defining the mounting datum plane 12 in angled relation to the suspension datum plane 14 such that the suspension datum plane extends substantially through the slider center of mass 16, extending the slider write gap 58 in a horizontal plane H-H, gimbal engaging the slider 18 on a dimple 56 having a center of curvature 62, and maintaining the dimple center of curvature substantially coincident with the slider gap horizontal plane, providing the suspension with a base 26 and a hinge 36 to support the beam 38, and disposing the suspension hinge and beam beyond the suspension datum plane and arranged to maintain the slider center of mass substantially within the suspension datum plane, the mounting plate having a surface 53 defining a mounting datum plane that does not include the slider center of mass, the suspension base having a surface 27 angled from the surface 55, and maintaining the suspension datum plane extending substantially through the slider center of mass, having the slider center of mass lie in a vertical plane V-V and the dimple have a longitudinal axis L-L, and maintaining the dimple longitudinal axis substantially coincident with the slider center of mass vertical plane, extending the slider gap 58 in the horizontal plane H-H, gimbal-engaging the slider on the dimple having a center of curvature, and maintaining the dimple center of curvature coincident with the slider gap horizontal plane, disposing the suspension hinge and beam beyond the suspension datum plane while maintaining the slider center of mass substantially within the suspension datum plane.

An embodiment of the invention has angle α between the mounting datum plane 12 and the suspension datum plane 14 of 1.72 degrees. In this example, the suspension uses a Pico slider 18 with a height of 0.012 inches and a center of mass 16 0.006 inches above the plane H-H. The offset distance is assumed to be is 0.008 inches. The first part 28 is displaced vertically from mounting datum plane 12 by the thickness of the mounting plate 52, in this case 0.005 inches. This results in the vertical distance from first part 28 to the center of mass 16 being (all dimensions in inches):

| | |
|---|---|
| Offset height | +0.008 |
| Slider height | +0.012 |
| H-H to center of mass | −0.006 |
| Mount plate thickness | −0.005 |
| Vertical distance from first part 28 to center of mass (net) | 0.009 |

The longitudinal distance from the bend in the base portion 26 where first part 28 joins second part 32 to the dimple axis L-L is assumed to be 0.300 inches. The vertical distance between mounting datum 12 and suspension datum 14 measured at dimple axis L-L in this example is 0.009 inches as calculated above. The angle α is calculated as tan−1=0.009/0.300 or 0.030.

Angle α is then 1.72 degrees.

Angle α at 1.72 degrees in the above will typically range from about 0.5 degree to about 5 degrees in other embodiments of the invention with the mounting plate 26 bent accordingly between its first part 28 and its second part 32. The angled relation of the mounting plate parts 38, 32 provides a uniquely conformed and novel mounting plate 26.

The invention thus provides an improved disk drive having fewer and less severe limitations and errors, a suspension and actuator combination for a disk drive suspension for such an improved disk drive, and a novel arrangement of suspension components that minimizes errors, specifically minimization of errors through a reduction in the force of error-generating motions. The invention further provides a disk drive suspension in which applied force from the actuator through the suspension to the slider and the slider center of mass are substantially coincident and not spaced to thus minimize torque applied to the slider, and a disk drive suspension in which the center of curvature of the dimple and the horizontal plane containing the slider gap are substantially coincident so as to minimize lateral gap displacement during suspension torsional vibration so that off-track lateral displacement motions, and therefore TMR errors due to torsional and sway vibrations, are reduced, thus minimizing drive performance degradations from seek and windage sources. Further, the invention provides an apparatus and a method of operating a disk drive having an actuator controlled suspension in operative association with a disk in which the suspension has a suspension datum plane and supports in gimballing relation a slider having a center of mass and a read write gap under use conditions including seek operations and/or disk-induced turbulent wind flow conditions that induce sway and/or torsion forces that produce lateral off-track motions of the slider gap, and maintaining the suspension datum plane substantially through the slider center of mass during such use conditions, whereby said sway forces are applied through said slider center of mass in lateral off track motion of said slider gap minimizing relation, and torsion forces are also minimized by having the dimple center of curvature lie substantially in the horizontal plane of the slider center of mass while the dimple longitudinal axis lies substantially coincident with vertical plane of the slider center of mass, in suspensions of the single stage, dual stage or microactuated types. The foregoing objects are thus met.

I claim:

1. A disk drive suspension comprising a load beam having a proximate region comprising a base portion extending in a mounting datum plane and also extending in a suspension datum plane at an angle to said mounting datum plane, and a distal region comprising a hinge portion and a beam portion, a flexure carried by said suspension distal region and supporting a slider in gimballing relation with said beam portion for operative association of said slider with a disk;
    wherein said slider has a center of mass, and
    a dimple for gimballing said slider relative to said beam portion, said suspension datum plane extending substantially through said slider center of mass.

2. The disk drive suspension according to claim 1, including also a mounting plate for mounting said suspension base portion to an actuator.

3. The disk drive suspension according to claim 1, wherein said slider center of mass lies in a vertical plane, and said dimple having a longitudinal axis, said dimple longitudinal axis being substantially coincident with said slider center of mass vertical plane.

4. The disk drive suspension according to claim 3, including a mounting plate for mounting said suspension base portion to an actuator.

5. A disk drive suspension comprising a load beam having a proximate region comprising a base portion extending in a mounting datum plane and also extending in a suspension datum plane at an angle to said mounting datum plane, and a distal region comprising a hinge portion and a beam portion, a flexure carried by said suspension distal region and supporting a slider in gimballing relation with said beam portion for operative association of said slider with a disk;
    wherein said slider has a write gap extending in a horizontal plane, and
    a dimple for gimballing said slider relative to said beam portion, said dimple having a center of curvature, said dimple center of curvature being substantially coincident with said write gap horizontal plane.

6. The disk drive suspension according to claim 5, wherein said slider has a center of mass, said suspension datum plane extending substantially through said slider center of mass.

7. The disk drive suspension according to claim 5, including a mounting plate for mounting said suspension base portion to an actuator.

8. A disk drive suspension comprising a load beam having a proximate region comprising a base portion extending in a mounting datum plane and also extending in a suspension datum plane at an angle to said mounting datum plane, and a distal region comprising a hinge portion and a beam portion, a flexure carried by said suspension distal region and supporting a slider in gimballing relation with said beam portion for operative association of said slider with a disk; and
    a mounting plate for mounting said suspension base portion to an actuator;
    wherein said slider has a center of mass, said suspension datum plane extending substantially through said slider center of mass.

9. The disk drive suspension according to claim 8, including also a dimple for gimballing said slider relative to said beam portion.

10. The disk drive suspension according to claim 9, wherein said slider has a write gap extending in a horizontal plane, said dimple having a center of curvature, said dimple center of curvature being substantially coincident with said slider gap horizontal plane.

11. The disk drive suspension according to claim 10, wherein said slider center of mass lies in a vertical plane, said dimple having a longitudinal axis, said dimple longitudinal axis being substantially coincident with said slider center of mass vertical plane.

12. A disk drive suspension comprising a load beam having a proximate region comprising a base portion extending in a mounting datum plane and defining a suspension datum plane, and a distal region comprising a hinge portion and a beam portion, a flexure carried by said suspension distal region and supporting a slider in gimballing relation with said beam portion for operative association of said slider with a disk, and a mounting plate for attaching said load beam base portion to an actuator, said mounting plate defining said mounting datum plane, said suspension datum plane extending in angled relation to said mounting datum plane;
    wherein said slider has a center of mass, said suspension datum plane extending through said slider center of mass.

13. The disk drive suspension of according to claim 12, wherein the mounting plate is free of aperturing providing a strain concentration.

14. The disk drive suspension of according to claim 12, wherein the angled relation is an angle of about 0.5 degrees to about 5 degrees.

15. The disk drive suspension according to claim 12, including a dimple for gimballing said slider relative to said beam portion.

16. A disk drive suspension comprising a load beam having a proximate region comprising a base portion extending in a mounting datum plane and defining a suspension datum plane, and a distal region comprising a hinge portion and a beam portion, a flexure carried by said suspension distal region and supporting a slider in gimballing relation with said beam portion for operative association of said slider with a disk, and a mounting plate for attaching said load beam base portion to an actuator, said mounting plate defining said mounting datum plane, said suspension datum plane extending in angled relation to said mounting datum plane;
  wherein said slider has a center of mass; and
    a dimple for gimballing said slider relative to said beam portion, said suspension datum plane extending substantially through said slider center of mass.

17. The disk drive suspension according to claim 16, wherein said center of mass of said slider lies in a vertical plane, and said dimple having a longitudinal axis, said dimple longitudinal axis being substantially coincident with said slider center of mass vertical plane.

18. A disk drive suspension comprising a load beam having a proximate region comprising a base portion extending in a mounting datum plane and defining a suspension datum plane, and a distal region comprising a hinge portion and a beam portion, a flexure carried by said suspension distal region and supporting, a slider in gimballing relation with said beam portion for operative association of said slider with a disk, and a mounting plate for attaching said load beam base portion to an actuator, said mounting plate defining said mounting datum plane, said suspension datum plane extending in angled relation to said mounting datum plane;
  wherein said slider has a write gap extending in a horizontal plane; and
    a dimple for gimballing said slider relative to said beam portion, said dimple having a center of curvature, said dimple center of curvature being substantially coincident with said write gap horizontal plane.

19. The disk drive suspension according to claim 18, wherein said slider has a center of mass lying in a vertical plane, wherein said dimple has a longitudinal axis, said dimple longitudinal axis being substantially coincident with said slider center of mass vertical plane.

20. A disk drive suspension comprising a load beam having a proximate region comprising a base portion extending in a mounting datum plane and defining a suspension datum plane, and a distal region comprising a hinge portion and a beam portion, a flexure carried by said suspension distal region and supporting a slider in gimballing relation with said beam portion for operative association of said slider with a disk, and a mounting plate for attaching said load beam base portion to an actuator, said mounting plate defining said mounting datum plane, said suspension datum plane extending in angled relation to said mounting datum plane;
  wherein a center of mass of said slider lies in a vertical plane, and
    a dimple for gimballing said slider relative to said beam portion, said dimple having a longitudinal axis, said dimple longitudinal axis being substantially coincident with said slider center of mass vertical plane;
  wherein said suspension datum plane extends through said slider center of mass.

21. The disk drive suspension according to claim 20, wherein said slider has a write gap extending in a horizontal plane, said dimple having a center of curvature, said dimple center of curvature being substantially coincident with said slider write gap horizontal plane.

22. A disk drive suspension comprising a load beam having a proximate region comprising a base portion defining a suspension datum plane, and a distal region comprising a hinge portion and a beam portion, a flexure carried by said suspension distal region and supporting a slider having a center of mass, a dimple providing gimballing contact of said slider with said beam portion for operative association of said slider with a disk extending in a disk plane, and a mounting plate for attaching said load beam base portion to an actuator, said mounting plate defining a mounting datum plane, said suspension datum plane extending in angled relation to said mounting datum plane;
  wherein said suspension datum plane extends through said slider center of mass and said hinge and beam portions lie outside said suspension datum plane.

23. The disk drive suspension according to claim 22, wherein said dimple has a center of curvature and a longitudinal axis, said slider has a write gap extending in a first plane substantially parallel with the plane of said disk and lying in a second plane normal to said first plane, said first plane substantially including said dimple center of curvature and said second plane being substantially parallel with said dimple longitudinal axis.

24. The disk drive suspension according to claim 22, wherein said slider has a write gap extending in a plane substantially parallel with the plane of said disk, said dimple having a center of curvature, said dimple center of curvature being substantially coincident with said slider gap plane.

25. The disk drive suspension according to claim 22, wherein said dimple has a longitudinal axis, said dimple longitudinal axis being substantially coincident with a vertical plane including said slider center of mass.

26. A disk drive suspension having minimized off-track error from sway forces, said suspension comprising a load beam having a proximate region comprising a base portion extending in a suspension datum plane, and a distal region comprising a hinge portion and a beam portion, a flexure carried by said suspension distal region and supporting a slider having a center of mass in gimballing relation with said beam portion for operative association of said slider with a disk, and a mounting plate for attaching said load beam base portion to an actuator, said mounting plate defining a mounting datum plane, said suspension datum plane extending in angled relation to said mounting datum plane and through said slider center of mass in sway force induced off-track error minimizing relation.

27. The disk drive suspension according to claim 26, including also a dimple for said gimballing of said slider, said dimple having a center of curvature and a longitudinal axis, said slider having a write gap extending in a plane substantially parallel with said disk plane, said slider write gap plane including said dimple center of curvature, said dimple longitudinal axis extending through said slider center of mass.

28. A disk drive suspension having minimized off-track error from torsion forces, said suspension comprising a load beam having a proximate region comprising a base portion extending in a suspension datum plane, and a distal region comprising a hinge portion and a beam portion extending outside of said suspension datum plane, a flexure carried by said suspension distal region and supporting a slider having a center of mass in gimballing relation with said beam portion for operative association of said slider with a disk, a mounting plate for attaching said load beam base portion to an actuator, said mounting plate defining a mounting datum plane, said suspension datum plane extending in angled relation to said mounting datum plane, said slider defining a write gap extending in a horizontal plane substantially parallel to said disk, and a dimple between said flexure and said beam portion in slider gimballing relation, said dimple having a center of curvature substantially within said slider gap horizontal plane to apply torsion forces through said slider gap in off track error from torsion forces-minimizing relation.

29. The disk drive suspension according to claim 28, wherein said suspension datum plane extends through said slider center of mass.

30. A disk drive suspension having minimal lateral response to sway forces from seek operations and/or disk induced turbulent air flow over the suspension, said suspension being adapted for mounting by a mounting plate defining a mounting datum plane, said suspension comprising a load beam supportable by said mounting plate and defining along its longitudinal axis a suspension datum plane disposed at an acute angle to said mounting datum plane, a flexure supported by said load beam, and a flexure-mounted slider in gimballing association with said load beam, said slider having a write gap and a center of mass, said suspension datum plane extending substantially through said slider center of mass;

wherein said write gap extends in a horizontal plane; and a dimple for gimballing said slider relative to said beam, said dimple having a center of curvature, said dimple center of curvature being substantially coincident with said write gap horizontal plane.

31. A suspension for a disk drive comprising a slider having a write gap extending in a horizontal plane and a center of mass, a load beam for supporting said slider, said load beam having a base portion, a hinge portion and a beam portion carrying a flexure mounting said slider, a dimple in engagement with said flexure for slider gimballing, a mounting plate mounting said load beam base portion at a surface defining a mounting datum plane, said dimple having a center of curvature substantially in the horizontal plane of the slider gap and a longitudinal axis substantially in a vertical plane of said center of mass, a suspension datum plane including a part of said base portion and extending substantially through said slider center of mass, said suspension datum plane being angled relative to said mounting datum plane.

* * * * *

UNITED STATES PATENT AND TRADEMARK OFFICE
CERTIFICATE OF CORRECTION

PATENT NO. : 7,570,458 B1  Page 1 of 1
APPLICATION NO. : 11/123446
DATED : August 4, 2009
INVENTOR(S) : Warren Coon It is certified that error appears in the above-identified patent and that said Letters Patent is hereby corrected as shown below:

At claim 18, column 17, line 17, after "supporting" delete ",".

Signed and Sealed this

Twenty-ninth Day of September, 2009

David J. Kappos
*Director of the United States Patent and Trademark Office*